Patented Aug. 1, 1950

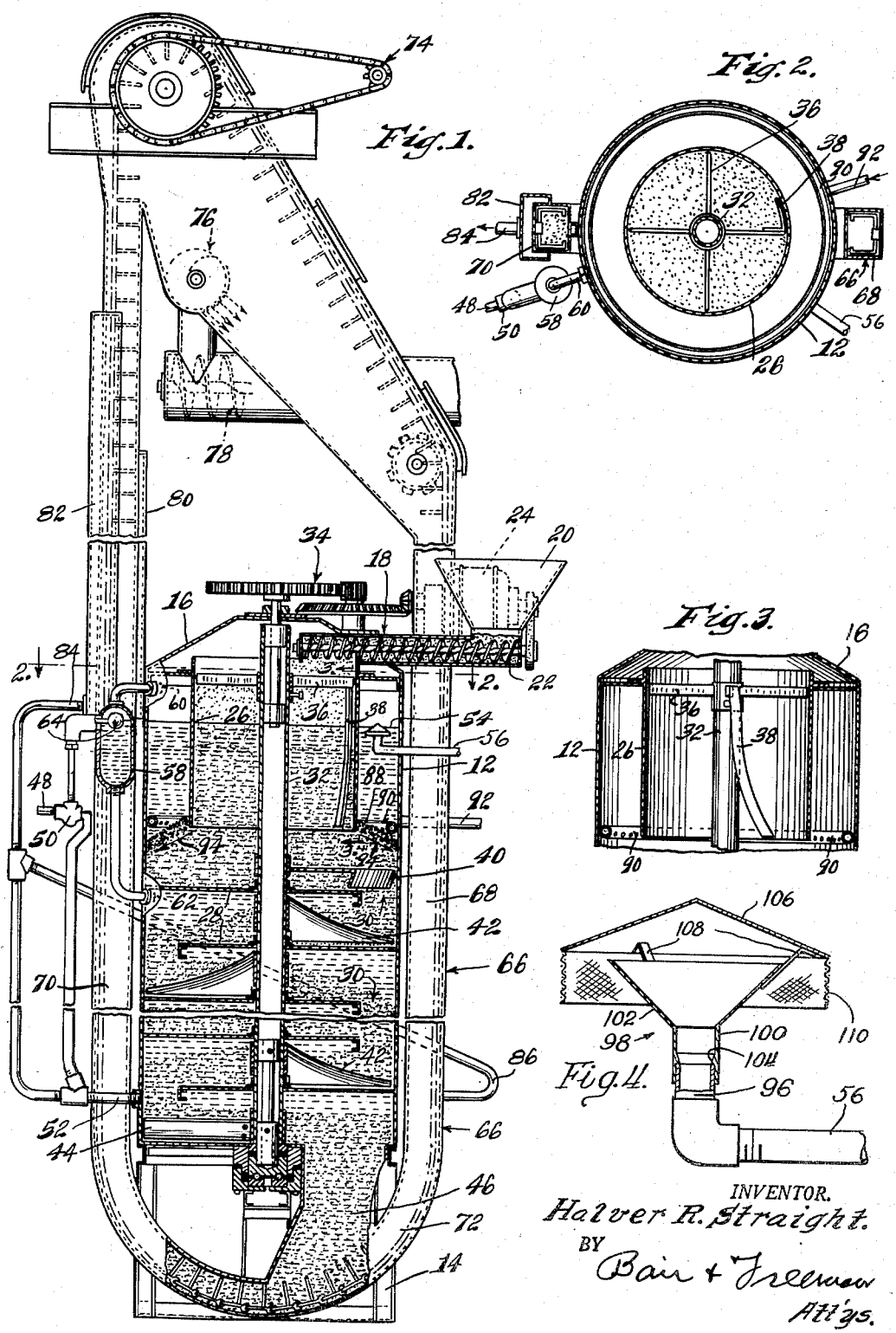

2,517,143

UNITED STATES PATENT OFFICE 2,517,143

APPARATUS FOR SOLVENT EXTRACTION OF OIL FROM OIL-BEARING SEEDS

Halver R. Straight, Adel, Iowa

Application February 20, 1947, Serial No. 729,691

2 Claims. (Cl. 23—270.5)

This invention relates to a solvent extraction column wherein oil is removed from soy beans and other oil bearing seeds by use of a solvent.

The apparatus to which my present invention is applied is disclosed in my co-pending application, Serial No. 652,148, filed March 5, 1946. The apparatus therein disclosed consists of a tower or column having a container for solvent, into which flaked soy beans are injected. The flakes are injected at the top of the tower, and fall by gravity through the solvent over a series of trays or shelves. As the flakes fall on each succeeding tray, sweep blades sweep the flakes off of that tray onto the next, so that the flakes require more time in their downward progress than they would in falling free.

The solvent for extracting oil from the seeds is flowed into the tower at the bottom and drawn off at the top, so that the flakes and solvent flow in opposite directions. An overflow pipe is provided adjacent the top of the tower for withdrawing oil-laden solvent, or miscella, from the tower.

An object to be obtained in this type of apparatus is that a constant and steady flow of miscella is attained. On reaching a certain level miscella will flow out at a uniform rate, as determined by the pump taking it away. The inflow of solvent is influenced by the rate at which bean flakes are injected into the tower; the outflow of miscella in turn is dependent on the speed or capacity at which the miscella pump operates. If the flakes are injected into the tower at a uniform rate, the flow of the solvent into the tower will be at a substantially uniform rate.

When bean flakes are injected in a manner which is not uniform, but in pulsating lots, the level of the miscella may rise at times to an objectionable height. To prevent continued inflow of solvent under such conditions, a float control is provided.

The float is adjusted to maintain the level of solvent or miscella in the tower above the level of the overflow pipe. The float operates a choke valve for increasing and decreasing the rate of flow of solvent to the tower.

The float control is encased in a cage on the exterior of the tower. The cage must have connections above and below the solvent level. Difficulty is encountered in connection with the lower point of communication between the cage and the tower, because as the flakes are passing through the tower the solvent liberates oil and fines from the flakes, and these fines work their way up into the float cage. This is undesirable, since they tend to choke the passages through the cage and prevent full operation of the float. To overcome this difficulty, I provide the lower communication between the cage and tower immediately below one of the shelves or trays, above referred to. In each space between adjacent shelves, the flakes and fines tend to drop to the bottom of the space, and the upper region of the space adjacent the undersurface of the next shelf above is comparatively free of flakes and fines. Thus the possibility of fines entering into the float cage is reduced to a minimum.

As reference to my co-pending application above referred to will show, a constriction is formed at the upper part of the tower, through which the miscella must pass. As the miscella passes through this constriction, fines and flour from the flakes fall from the miscella and collect at the bottom of the constriction, and form a filter suspended by the surfaces defining the constriction. This filter removes the fines from the miscella passing upwardly therethrough, whereby the miscella emerging from the tower is practically free of any solid particles. However, as time goes on, this crust becomes solid, or too tightly encrusted for the passage of miscella, and must be disintegrated or reduced in solidity.

To provide for disintegration of this filter or crust, I provide a perforated pipe immediately above the filter, and to disintegrate the filter or crust, solvent is injected through the perforated pipe, from which solid streams impinge on the crust. This forms a number of holes in the crust and weakens it to such an extent that it falls out of this position. A new filter is then built up gradually by the flow of miscella through the tower.

Another feature of the present invention is a means for accomplishing a steady downward flow of the flakes at the inlet to the tower or container.

The inlet to the tower through which the flakes are injected is of reduced capacity, relative to the tower and, under certain conditions, there is a tendency of the flakes to bind and choke the inlet. This is true particularly if the flakes are gummy; they will not flow readily, but tend to choke the inlet passage.

I have overcome this difficulty by a specifically designed and shaped clearing knife. This knife rotates in the inlet passage and is curved to accommodate normal downward flow of the flakes. If the flakes fall normally, the knife does not impinge on or bear against the flakes. This is essential since it is desirable not to have any crushing effect on the flakes. However, on the first instance of any flakes choking the inlet passage, this clearing knife will clear away the flakes causing the choking condition, and permit the flakes to fall freely.

With these and other objects in view, my invention consists in the construction, arrangement and combination of the various parts of my device whereby the objects contemplated are attained, as hereinafter more fully set forth, pointed out in the claims and illustrated in the accompanying drawings, in which:

Figure 1 is a vertical sectional view through the apparatus employing my invention;

Figure 2 is a horizontal sectional view taken on line 2—2 of Figure 1;

Figure 3 is a view taken approximately on the line 3—3 of Figure 1, and

Figure 4 is an enlarged detail view of the construction of the outlet pipe.

Referring now in detail to the drawing, the apparatus includes a vertical tower or container 12, preferably of cylindrical cross-section, mounted on a base 14. The top of the tower 12 is closed by a dome 16 through which is an inlet 18 for the injection of bean flakes, from which oil is to be removed.

The bean flakes are inserted in hopper 20 from which a screw conveyor 22 forces the flakes through the inlet 18. The screw conveyor 22 is operated by a conventional motor 24.

Mounted at the top of the tower or container 12 in the interior thereof is a tubular member 26 open at the top and bottom and positioned in registration with the inlet 18 for the reception of bean flakes from the screw conveyor 22.

Spaced vertically through the tower or container 12 are a plurality of shelves or trays 28, rigidly mounted on the inner surface of the container. Each shelf 28 is provided with an opening therethrough indicated at 30, and these openings are positioned on alternately opposite sides of the container.

Mounted vertically in the container 12 is a rotatable shaft 32 extending the full length of the container and driven by gearing 34, which in turn is driven by the motor 24.

Mounted on the shaft 32 adjacent the top of the tubular member 26 is a leveling sweep 36 which comprises a plurality of arms terminating adjacent the wall of the tubular member 26.

Secured to the extremity of one of the arms of the sweep 36 is a clearing knife 38, which extends downwardly and terminates adjacent the lower edge of the tubular member 26. Reference to Figures 2 and 3 will show that the clearing knife 38 is curved rearwardly and downwardly with respect to the direction of rotation of the leveling sweep. The clearing knife 38 is positioned with one edge leading, and its flat side adjacent the wall of the tubular member. The clearing knife may also be curved linearly to accommodate the curvature of the tubular member 26, so as to follow the wall of the tubular member 26 closely in its rotation.

Mounted on the shaft 32 above the top shelf 28 is a sweep blade 40, which on rotating with the shaft 32 sweeps the flakes on the top shelf 28 toward the opening 30 therein.

In each of the spaces between adjacent shelves 28 is another type of sweep blade 42 employed for the same purpose as the blade 40, that is, for sweeping the flakes on the respective shelf toward the opening 30 therein.

Below the bottom shelf 28 is a third type of sweep blade 44, for sweeping the flakes from the bottom of the container into a chute 46, from which the flakes are carried away by an elevator, which will be described later.

The particular construction of the tubular member 26, the shelves 28, and the sweep blades 40, 42 and 44, are of the type shown and described in my copending application, Serial No. 652,148, filed March 5, 1946, where they are described in detail.

The solvent used for extracting the oil from the seeds is preferably hexane, although other solvents may be used, if desired. As the solvent passes through the container and extracts oil from bean flakes, the mixture of solvent and oil is known as miscella, and reference to solvent in the specification or claims is intended to include miscella as well, unless the distinction is specifically referred to.

The solvent is injected into the apparatus through inlet 48. The inlet 48 is in communication with a choke valve 50 and pipe 52 entering the container 12, at the lower part thereof. Fresh solvent is flowed into the container, filling the container until it reaches a normal level indicated at 54. At a point near the normal level 54 an outlet pipe 56 leads from the container, from which a pump pumps the miscella to an evaporator. The evaporator may be of any conventional type and is for the purpose of separating from the solvent the oil which has been removed from the seed flakes. The outlet pipe 56 is provided with a shield, the construction of which will be described later in connection with Figure 4.

Mounted on the exterior of the container 12 adjacent the top is a float cage 58 having communication with the interior of the container at points 60 and 62. The upper point 60 is above the level 54, and the lower point 62 is disposed immediately below the top shelf 28 and at the side of the container opposite the opening 30 in that shelf. Solvent from the container enters into the float cage from the lower pipe at the point 62 and finds its level therein equivalent to the level of the solvent in the container. A float 64 is mounted in the float cage 58 and in response to the level of the solvent in the float cage operates the choke valve 50, in a conventional manner.

An elevator 66 is utilized for carrying the flakes from the container after they have passed through it. The elevator 66 comprises a down leg 68, and an up leg 70, connected by an arcuate portion 72 at the bottom of the container. The elevator 66 includes an enclosing casing which has open communication with the chute 46 for the reception of flakes therefrom.

The elevator 66 is operated by an appropriate drive means indicated generally at 74. The flakes from the bottom of the container are carried by the elevator upwardly and dumped into a wringer 76 where solvent or miscella is wrung from the flakes. The flakes are then conducted away by a screw conveyor 78 to a drier.

Mounted on the up leg 70 of the elevator is a rinsing apparatus, comprising an inlet channel 80 and an outlet channel 82. This rinsing apparatus is that shown and described in my copending application, Serial No. 685,394, filed July 22, 1946, now abandoned, and need not be described in detail herein. Suffice it to say that the general purpose of this rinsing apparatus is to supply fresh solvent for rinsing residual oil from the flakes, which are carried up in the elevator 66. The operation of the solvent in the container does not take 100% of the oil out, but some is left in, and the supply of fresh solvent is effective for extracting an additional amount of oil from the flakes.

The solvent from the rinsing apparatus is not fully laden with oil and accordingly it can be reused in the container for removing additional oil from the flakes. An outlet pipe 84 leads from the bottom of the discharge channel 82, and communicates alternately, as desired, with inlet 52 in the bottom of the casing, or to the down leg 68 of the elevator, as indicated at 86. By injecting solvent into the down leg 68 of the elevator, it again finds its way into the container through the chute 46.

It will be noted that the tubular member 26 forms a constricted space between itself and the wall of the container 12. At the bottom of this constriction solid particles from the flakes form a filter or crust 88, as explained in my co-pending application, Serial No. 652,148, referred to above. A circular perforated pipe 90 is secured to the wall of the container just above the point where the filter forms. The perforations in the pipe 90 extend downwardly or at a slight angle from the lower surface. An inlet 92 communicates with the pipe 90 for flowing solvent into the perforated pipe for directing solid streams of solvent into the filter 88.

The inner end of the outlet pipe 56 is provided with an elbow, as seen in Figure 4, and a nipple 96 extending upwardly. A specially formed fitting 98 is placed on the nipple 96. The fitting 98 is formed with a tubular portion 100 and a funnel portion 102 opening upwardly. The interior of the tubular portion 100 is formed with a tapered bead 104 for supporting the fitting 98 on the nipple 96, and baffling the miscella into the nipple.

A cone-shaped shield 106 is positioned in spaced relation over the funnel portion 102 and secured thereto as by brackets 108. Depending from the marginal edge of the shield 106 is a skirt 110 formed of screen or mesh material. The skirt 110 extends below the upper marginal edge of the funnel portion 102. The assembly is placed so that the upper marginal edge of the portion 102 is positioned below the normal level of the miscella.

Operation

In the ideal operation of the device, crushed seed flakes are delivered through the inlet 18 at a constant rate, and solvent is flowed into the inlet 52 at a constant rate. When both of these rates of flow are constant, the removal of oil from the seed flakes is the most efficient.

In the best operation of the device, the column or container 12 is kept substantially full of seed flakes, which includes the tubular member 26 full to the top. When the tubular member 26 is full of flakes, the leveling sweep 36 rotates and levels the flakes across the whole area of the tubular member 26.

If the seed flakes are not in the best condition, for example, if they should be slightly gummy, they tend to arch across between the shaft 32 and the inner surface of the tubular member 26. For this reason the clearing knife 38 is provided on the leveling sweep 36. In normal operation of the apparatus, the flakes have a more or less uniform rate of fall. The rearward curvature of the clearing knife 38 is equal to the circumferential distance traveled by the leveling sweep 36 in the time that the flakes fall the vertical length of the blade. As long as the normal rate of fall of flakes prevails, the clearing knife 36 produces no effect, but only follows the flakes in their path of fall. If any of the flakes should begin to arch across the tubular member 26, and thereby choke the tubular member, the clearing knife 38 will clear those flakes as quickly as they begin to choke.

The flakes substantially fill the space between the top shelf 28 and the lower edge of the tubular member 26. The sweep arm 40 forces the flakes toward the opening 30 in that shelf.

In the spaces between adjacent shelves 28, the flakes form a slope approximately as indicated immediately below the top shelf 28. The sweep blades 42 gradually and successively sweep the flakes toward the opening 30 in successive shelves. Immediately below each shelf on the side thereof opposite its opening 30, is a space above the lower end of the slope of flakes, in which there is virtually clear solvent or miscella, having no solid particles. At such a point, i. e., immediately below the top shelf, the inlet 62 of the float cage communicates with the interior of the container 12. The solvent enters at this point to the float cage and since it is clear of solid particles, there is small likelihood of solid particles choking the passages through the float cage.

If a sudden rush of flakes is injected into the tower, the miscella rises above the normal level. Since the miscella is carried off by a pump at a constant rate, it is of course necessary to limit the inflow of solvent under such circumstances. The float 64 on rising with the rising level chokes the valve 50 and reduces the inflow of solvent.

The filter 88 is formed as a result of continued action over quite a period of time. Particles of seed flakes bridge across the lower end of the constriction between the tubular member 26, and the shell of the container 12. During this process the solvent on passing upwardly through the filter leaves small particles of flakes which were carried with it, known as fines or flour, and emerges as substantially clear liquid. The flakes emerging from the lower end of the tubular member 26 work outwardly along the under-surface of the filter, as indicated by the arrows 94. The tendency of this brushing of flakes is to keep the filter 88 somewhat clear and prevent it from becoming solid. Nevertheless, the filter eventually does become solid and after a prolonged length of time would prevent a sufficiently free passage of liquid therethrough. The perforated pipe 90 therefore is brought into play under such conditions. Solvent is injected through the inlet 92 into the perforated pipe 90 and concentrated streams of solvent emerge from the downwardly directed openings in the pipe and penetrate the filter. This forms holes in the filter, which breaks up the filter and permits it to drop, and a new filter is formed over a period of time, as explained above.

It will be noted that in disintegrating the filter, the flow of solvent is reversed through a portion of the container. When the flow of solvent is thus temporarily reversed at this point, inflow of solvent at the inlet 52 may be cut off or reduced.

The shield assembly on the outlet pipe 56 prevents foreign matter from entering the outlet pipe 56, and consequent possible choking of the pipe. Any foreign material in the tower tends to form a film on the surface of the miscella. Since the screen skirt 110 extends below the upper edge of the portion 102, such film of foreign matter is prevented from entering the outlet pipe. The outer surface of the screen skirt 110 can be cleared from foreign matter at intervals as desired.

The normal level of the miscella in the tower may remain above the outlet pipe, because the rate of outflow is determined by the speed of operation of the miscella pump referred to above.

While I have shown a particular embodiment of my invention, it will be understood of course that I do not wish to be limited thereto, since many modifications may be made, and I therefore contemplate by the claims appended hereto to cover any such modifications or substitutions of mechanical equivalents as fall within the true spirit and scope of my invention.

I claim:

1. In a solvent extraction apparatus, a container, means for providing flow of solvent upwardly through said container including an outlet adjacent the top of the container, a tubular member at the top of the container terminating at a point below said outlet, means for supplying seed flakes through said tubular member into the container, a levelling sweep rotatably mounted in the upper part of said tubular member, a clearing knife secured to the periphery of said levelling sweep and extending downwardly to substantially the lower extremity of said tubular member, said tubular member forming a constriction with the container whereby a filter of seed particles is formed in said constriction by the flow of solvent therethrough, means in said constriction above and adjacent to the bottom thereof for directing a stream of solvent downwardly and float control means for controlling the flow of solvent through the container, said float control means being secured to the exterior of the container and having communication with the interior of the container above and below said filter respectively.

2. In a solvent extraction apparatus, a container, means for causing upward flow of solvent through the container, a tubular member for receiving oil-bearing flakes supported in the upper part of the container, a levelling sweep rotatably mounted in the upper part of said tubular member, and extending to adjacent the periphery of said tubular member, and a clearing knife secured to the periphery of said levelling sweep and extending downwardly to substantially the lower extremity of said tubular member, the lower end of said clearing knife being curved rearwardly with respect to the direction of rotation of said levelling sweep.

HALVER R. STRAIGHT.

REFERENCES CITED

The following references are of record in the file of this patent:

UNITED STATES PATENTS

| Number | Name | Date |
|---|---|---|
| 2,158,782 | Bonotto | May 16, 1939 |
| 2,187,890 | Pattee | Jan. 23, 1940 |
| 2,276,298 | Frazier | Mar. 17, 1942 |
| 2,282,265 | Swallen | May 5, 1942 |
| 2,299,426 | Rosebough | Oct. 20, 1942 |